Figure 1:
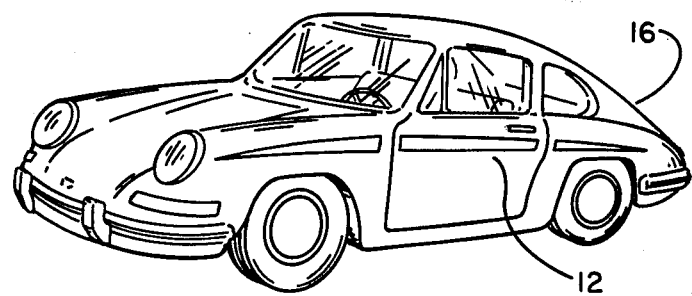

United States Patent [19]

Melby

[11] Patent Number: 4,461,503

[45] Date of Patent: Jul. 24, 1984

[54] ELECTRIC BODY TRIM GUARD FOR AUTOMOBILES

[76] Inventor: Phillip J. Melby, 211 N. Delaware, Mason City, Iowa 50401

[21] Appl. No.: 418,249

[22] Filed: Sep. 15, 1982

[51] Int. Cl.³ ............................................. B60R 27/00
[52] U.S. Cl. ..................................... 293/118; 293/128
[58] Field of Search ......................... 293/118, 128, 10; 180/270, 287

[56] References Cited

U.S. PATENT DOCUMENTS

| | | | |
|---|---|---|---|
| 2,678,232 | 5/1954 | Barry | 296/44 |
| 3,243,222 | 3/1966 | Loughery et al. | 296/44 |
| 3,307,867 | 3/1967 | McGovern | 293/62 |
| 3,718,357 | 2/1973 | Hertzell | 293/9 |
| 4,221,410 | 9/1980 | Dawson | 293/21 |
| 4,221,412 | 9/1980 | Miller | 293/118 |
| 4,234,222 | 11/1980 | Bays | 293/124 |
| 4,332,306 | 6/1982 | Turatti | 180/287 |
| 4,334,700 | 6/1982 | Adell | 280/770 |
| 4,334,706 | 6/1982 | Seki | 293/126 |

*Primary Examiner*—Robert R. Song
*Attorney, Agent, or Firm*—Robert T. Johnson

[57] ABSTRACT

This invention discloses means to protect automobile sides and door panels from scratches, bumps and similar damage, particularly the door panels or sections, by means of an Electric Body Trim Guard, which comprises an extendable trim guard mounted on door panels, and retracting the extended trim by means of electrically activated solenoids.

3 Claims, 4 Drawing Figures

U.S. Patent   Jul. 24, 1984   Sheet 1 of 2   4,461,503

ELECTRIC BODY TRIM GUARD FOR AUTOMOBILES

Automobiles are subject to scratches, bumps and similar damage to the sides, particularly to the door sections.

This present invention is to disclose means to protect automobiles from such damage by extendable body trim guards.

This invention may be briefly summarized as a guard for automobile sides and door panels, said guard comprised of a body trim guard actuated to extend outward from side panels by compression springs and withdrawing of the body trim guard from its outward extension by action of electrical solenoids to overcome the compression springs.

It is an object of this invention to disclose means to protect the sides and/or door panels of automobiles from damage by means of a body trim guard which is mounted on the outer panels of automobile doors and/or side panels and is extendable and retractable.

It is another object of this invention to disclose electrically actuated body trim guard.

It is another object of this invention to disclose means of extending body trim guard outwardly from the outer surface of side door panels of automobiles, by action of springs under compression, when the electric power is turned off of solenoids which had held the trim guard in a retracted position.

Another object of this invention is to disclose an electric body trim guard assembly for protection of door panels of automobiles comprising a movable body trim guard and means to extend said movable body trim guard outward from said door panels and means to retract said movable body trim guard by electrical activation of solenoids, said electrical activation actuated by ignition switch of said automobile.

Another object of this invention is to disclose means to retract body trim guard from its outward extension by means of electrically actuated solenoids, said solenoids actuated by the ignition switch being turned to "on"; thus when the switch is turned to on, the solenoids retract the trim guard by overcoming the springs in compression.

Prior art U.S. Pat. Nos. pertaining to guards for automobiles to prevent scratches, dents and bumps are as follows:

2,678,232—to Barry, for "Retractable Door Guard for Automobiles". This covers a mechanically operated door guard, actuated by opening the door. This guard protects only the door edge. In view of the above, this patent does not touch this present invention.

3,243,222—to Loughery for "Retractable Door Bumper for Vehicles". In this patent, the "Bumper" is actuated an opening the vehicle door. This Bumper protects only the edge portion of the door. This then does not touch this present invention.

3,307,867—to McGovern for "Spring Biased Bumper". This patent covers a permanently mounted "spring mounted" bumper. This is not a "retractable" or "actuable" mounting.

3,718,357—to Hertzell for "Retractable Side Bumper Guard". This covers a guard assembly mounted beneath the automobile body and is actuated by air cylinders to extend the base board. This guard assembly is not mounted on the doors.

In view of above, this present invention is entirely different from the above patent.

4,221,410—to Dawson for "Vehicle Protective Guard". This covers apparatus to move the bumper to a position away from the vehicle and apparatus to raise and lower the bumper when in a position away from the vehicle. This patent then does not pertain to this present invention.

4,221,412—to Miller for "Extendable Vehicle Lateral Side Guard". This covers an extendable guard actuated by a vacuum-actuated piston, and having a U shaped support frame in the door frame, with vertical parallel arms, so spaced apart to pass on the sides of the window. This present invention is vastly different than the above patent in that the mechanism for this invention does not touch the above patent.

4,234,222—to Bays for "Protective Device for Automobiles". This covers a flexible steel tape mounted on extendable arms to protect the side of the vehicle. This patent then does not pertain to this present invention.

4,334,700—to Adell for "Door Edge Guard". This covers only a protective edge guard for the edge of automobile doors. This patent then does not pertain to the present invention.

4,334,706—to Seki for "Guard Molding for Outer Surfaces of a Car". This guard molding is adhered to the outer surface of the vehicle. This present invention does not involve such a guard as is covered in the above patent.

Figure 2:
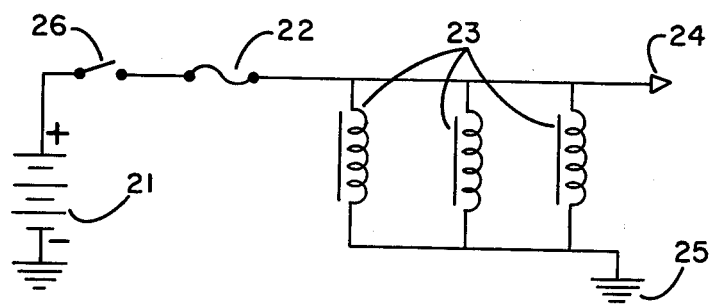

Referring to the drawings:

FIG. 1 shows an automobile 16 with body trim guard 12 mounted thereon. FIG. 2 shows the electrical circuit for the body trim guard which components are:

Battery, as electrical source: 21
Fuse: 22
Solenoids: 23
Leads to other solenoids in system: 24
Common bus bar ground: 25
Ignition system switch: 26

Figure 3:
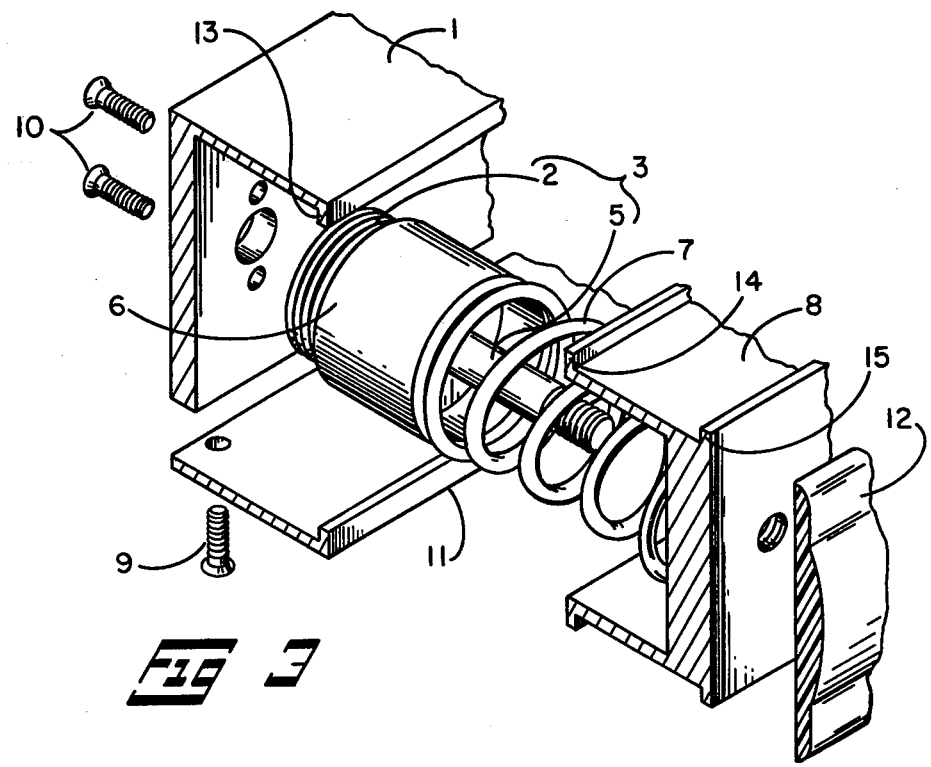

FIG. 3 is an enlarged view of a solenoid and body trim guard shown in expanded relation wherein the components are:

Main trim housing: 1
Solenoid: 3
Solenoid comprising:
 windings: 2
 magnetic pole armature: 5
Steel sleeve: 6
Compression Spring: 7
Movable Body Trim Guard: 8
Screws to connect bottom of trim: 9
Screws to fasten main trim housing onto outside of door panel: 10
Bottom of trim: 11
Body trim guard: 12
Stop lip on main trim housing: 13
Stop lip on movable body trim guard: 14
Stop lip on retraction of movable body trim guard: 15

Figure 4:
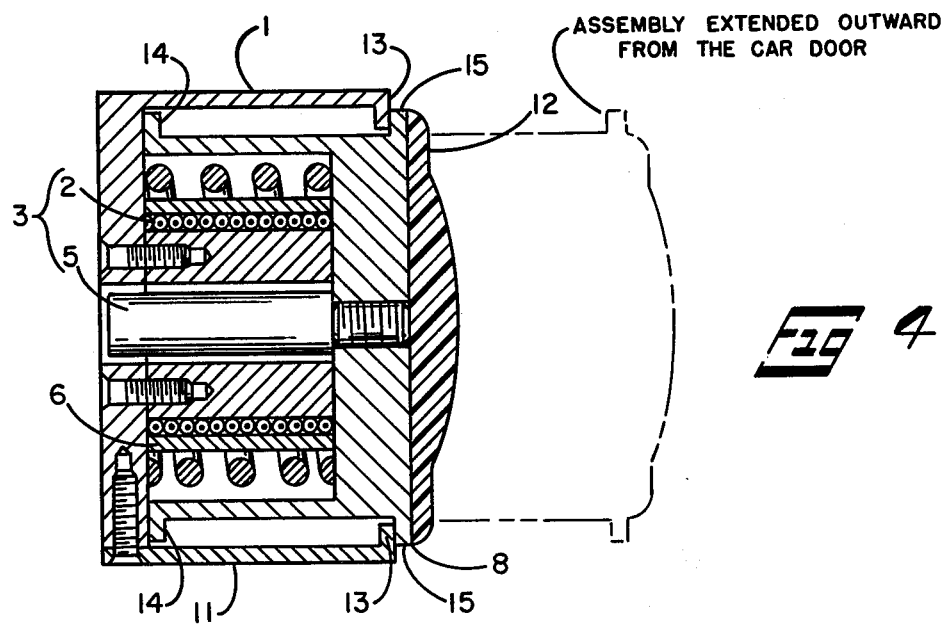

FIG. 4 is a cut-away view of activated solenoid, when the ignition switch 26 is turned "on", thus allowing current to flow in windings wherein the components are:

Main trim housing: 1
Solenoid: 3
Solenoid comprising:
 Windings: 2
 Magnetic pole armature: 5
Steel Sleeve: 6

Compression Spring: 7
Movable body trim guard: 8
Bottom trim: 11
Body trim guard: 12
Stop lip on main trim housing: 13
Stop lip on movable body trim guard: 14
Stop lip on retraction of movable body trim guard: 15

The main trim housing 1 is permanently mounted to the doors or the side panels of automobiles. Attached to the inside of this main housing 1 are the windings 2 of each electrical solenoid 3. These solenoids are located along and on the inside of the main housing 1 spaced approximately eight inches apart.

Associated with the main housing 1 is the armature 4 which is a major component of the system. The armature 5 is a magnetic material and has a magnetic pole 5 which will pull into the solenoid 3 when the solenoid 3 is activated by an electrical current under control of the automobile "on-off" ignition switch.

When the ignition switch is turned to "on", the solenoids are activated by electric current to the windings, at which time the trim guard will then be in its retracted position.

When the ignition switch is turned to "off", the solenoids are deactivated, and the springs under compression force the movable body trim guard 8, outward from the automobile doors, and side panels. Over each solenoid 3 there is a steel sleeve 6 and over the sleeve 6 is a compression spring 7 to push or force the armature 5 to move outward when the electrical current to the solenoid 3 is discontinued when the ignition switch is turned "off".

When the ignition is turned "off" the solenoids 3 are deactivated and the magnetic pull on the armature 5 is released. At this time the compression spring 7 located over each solenoid 3 will bring mechanical pressure to bear on the armature 5 and mechanically force the armature 5 outwards from the car door or side panel thereby giving protection from scuffing from other automobile doors. This armature 5 should move outwards approximately three-quarters of an inch to one inch. The armature 5 will remain in this position as long as the automobile ignition is turned off.

When the ignition is turned on, the electrical current through each solenoid 3 will produce a magnetic field which will overcome the mechanical force of the compression springs 7 thereby causing the armature 5 to be pulled back towards the automobile car door or side panels.

The magnetic force of the solenoids will be larger than the force of the compression springs 7 to pull the pole 5 and assembly 8 back towards the main door trim housing 1. The armature 5 of each solenoid, 3 will remain in this position as long as the automobile ignition switch is turned "on". When the ignition switch is turned "off" the magnetic field produced by the solenoids 3 decays and once again the mechanical force of the compression springs 7 becomes the predominate force and forces the armature 5 and assembly 8 outwards from the car door for protection from damage by other vehicles.

The electrical circuit consists of a fused power lead from and under control of the ignition switch so that the electrical circuit is activated only when the ignition switch is turned "on". The solenoids 3 are wired in a simple parallel circuit with the fused power lead furnishing 12 volts to each of the solenoids. The return lead for the electrical circuit is grounded to the chassis ground by means of a common bus bar or equivalent. A common bus is preferred for trouble-free service.

The fused power lead is run from the automobile fuse panel, through the door frame and along the main door trim housing 1 and to each of the solenoids 3 in the housing.

A typical electrical circuit for this type of operation is shown in FIG. 2.

I claim:

1. An electric body trim guard for automobiles comprising a body trim channel containing solenoids and compression springs, said solenoids working against said compression springs, and means to electrically activate said solenoids to overcome the compression springs.

2. An electric body trim guard for automobiles of claim 1, wherein the solenoid magnetic poles and assembly is extended outwardly to stops by means of compression springs, when said solenoids are deactivated.

3. An electric body trim guard assembly for automobiles of claim 2 wherein solenoids are activated by an electric current through an ignition switch of said automobiles as means to retract solenoid armature pole and body trim guard assembly attached thereto.

* * * * *